(12) United States Patent
Ben-Natan

(10) Patent No.: US 11,934,466 B2
(45) Date of Patent: *Mar. 19, 2024

(54) DIRECT CLOUD STORAGE INTAKE AND UPLOAD ARCHITECTURE

(71) Applicant: jSonar Inc., San Mateo, CA (US)

(72) Inventor: Ron Ben-Natan, Lexington, MA (US)

(73) Assignee: jSonar, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,450

(22) Filed: Nov. 4, 2021

(65) Prior Publication Data

US 2022/0058226 A1 Feb. 24, 2022

Related U.S. Application Data

(63) Continuation of application No. 15/947,739, filed on Apr. 6, 2018, now Pat. No. 11,227,019.

(51) Int. Cl.
| | |
|---|---|
| *G06F 16/00* | (2019.01) |
| *G06F 16/2455* | (2019.01) |
| *G06F 16/31* | (2019.01) |
| *G06F 16/33* | (2019.01) |
| *G06F 16/93* | (2019.01) |
| *H04L 67/1097* | (2022.01) |

(52) U.S. Cl.
CPC .......... *G06F 16/93* (2019.01); *G06F 16/2455* (2019.01); *G06F 16/31* (2019.01); *G06F 16/3331* (2019.01); *H04L 67/1097* (2013.01)

(58) Field of Classification Search
CPC ...... G06F 16/93; G06F 16/31; G06F 16/3331; G06F 16/2455
USPC ................................................. 707/737, 723
See application file for complete search history.

(56) References Cited

U.S. PATENT DOCUMENTS

| | | | |
|---|---|---|---|
| 9,722,973 B1 * | 8/2017 | Kothari | ............... H04L 63/0435 |
| 2005/0108212 A1 * | 5/2005 | Karimisetty | ...... G06F 16/24573 |
| 2013/0254171 A1 * | 9/2013 | Grondin | ................ G06F 16/256 |
| | | | 707/723 |

* cited by examiner

*Primary Examiner* — Chelcie L Daye
(74) *Attorney, Agent, or Firm* — WOMBLE BOND DICKINSON (US) LLP

(57) ABSTRACT

Embodiments of the present disclosure provide a data gathering and query method for collecting ongoing updates to large, unstructured or semi-structured databases. The method comprises gathering a plurality of events defined in a database syntax that is not structured and aggregating the plurality of events into one or more part files. Each of the one or more part files store a subset of the plurality of events in a columnar format, and each of the one or more part files comprises a header file that includes metadata corresponding to a subset of the plurality of events stored in the part file and is separate from the subset of events stored in the part file. The method further comprises uploading the one or more part files to a cloud storage repository configured to store the one or more part files so that they can be queried by a query server based on the header files.

17 Claims, 6 Drawing Sheets

DIRECT CLOUD STORAGE INTAKE AND UPLOAD ARCHITECTURE

CROSS-REFERENCE TO RELATED APPLICATIONS

This application claims priority to U.S. application Ser. No. 15/947,739, filed Apr. 6, 2018 and entitled "DIRECT CLOUD STORAGE INTAKE AND UPLOAD ARCHITECTURE," which is hereby incorporated by reference.

BACKGROUND

Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions. The vast quantities of data which may be accumulated and stored, however, require corresponding computing power to effectively manage. Since unstructured data can be gathered from sources that would not be feasible with a relational database, for example, there is a greater volume of data available for such emerging fields as data analytics.

SUMMARY

A data gathering and query method for collecting ongoing updates to large, unstructured or semi-structured databases performing data collection from multiple sites strives to gather and store data into a cloud store where it will undergo processing. Rather than sending the data to the database itself which does inserts of the data into the storage layer, the endpoints (enterprise sites) do the operations that would have been done by the database and upload block files directly to cloud storage, thereby "bypassing the database".
. A large repository of unstructured or semi-structured data according to a JSON (Javascript Object Notation) syntax receives periodic updates from enterprise sites for gathered event data. A cloud store maintaining the collections, often referred to as "Bigdata", receives the additions as columnar parts. The columnar parts arrange the data in a columnar form that stores similarly named fields consecutively. The enterprise sites generating the event data arranges the parts into block files containing the columnar data, and header files containing metadata. Incremental time and/or size triggers the periodic part upload, and a query server in network communication with the cloud store integrates the incoming additions by receiving the header files and updating a catalog of collections in the cloud store, without downloading the larger block files containing the actual columnar data. Query requests from the query server utilize the catalog and header file information for performing query requests on the cloud store without moving the block files. The query server provides interrogative access to the columnar bigdata files in the cloud store without the burden of processing the entire data file. The disclosed approach therefor effectively offloads the columnar upload and intake to the enterprise site (customer site).

Configurations herein are based, in part, on the observation that bigdata storage, maintenance, and retrieval requires substantial computing resources. While the storage volume alone is significant, effectively querying a large data set is also time and computationally consuming and may not be feasible or practical in all circumstances. Unfortunately, conventional approaches to bigdata management suffer from the shortcoming that gathering the data in a manner conducive to later queries is itself a computationally intensive operation. Indexing, mapping and arranging incoming data tends to create bottlenecks and queuing at an intake point or system. Merely transporting data in a native form results in a mass of data that may be cumbersome for subsequent access, for example requiring sequential searching through text documents. This is further complicated by the burstiness of a data source, as a stream of intermittent additions complicate insertion into the preexisting store and create sudden demand spikes for the intake. Conventional approaches, therefore, can tend to periodically overwhelm a gathering or intake server with a sudden burst of input. Accordingly, configurations herein substantially overcome these shortcomings by providing a distributed edge-based columnar intake that arranges a sequence of additions into a columnar form at the data source, and periodically uploads aggregated, columnar parts of the data. The uploaded columnar parts are therefore arranged into bifurcated block and header files, and integrated into a preexisting collection of data by referencing only the header files in a catalog of the columnar files defining the collection.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below implement a gathering, aggregation and upload approach for a bigdata storage repository, or cloud store, responsive to multiple enterprise (customer premises) sites for receiving periodic event data for storage and subsequent queries. Event data is periodically and somewhat sporadically generated, suitable for emphasizing the advantages of the disclosed approach, however any gathering and upload of large quantities of unstructured or semi-structured data (e.g. bigdata) will benefit.

Figure 1:
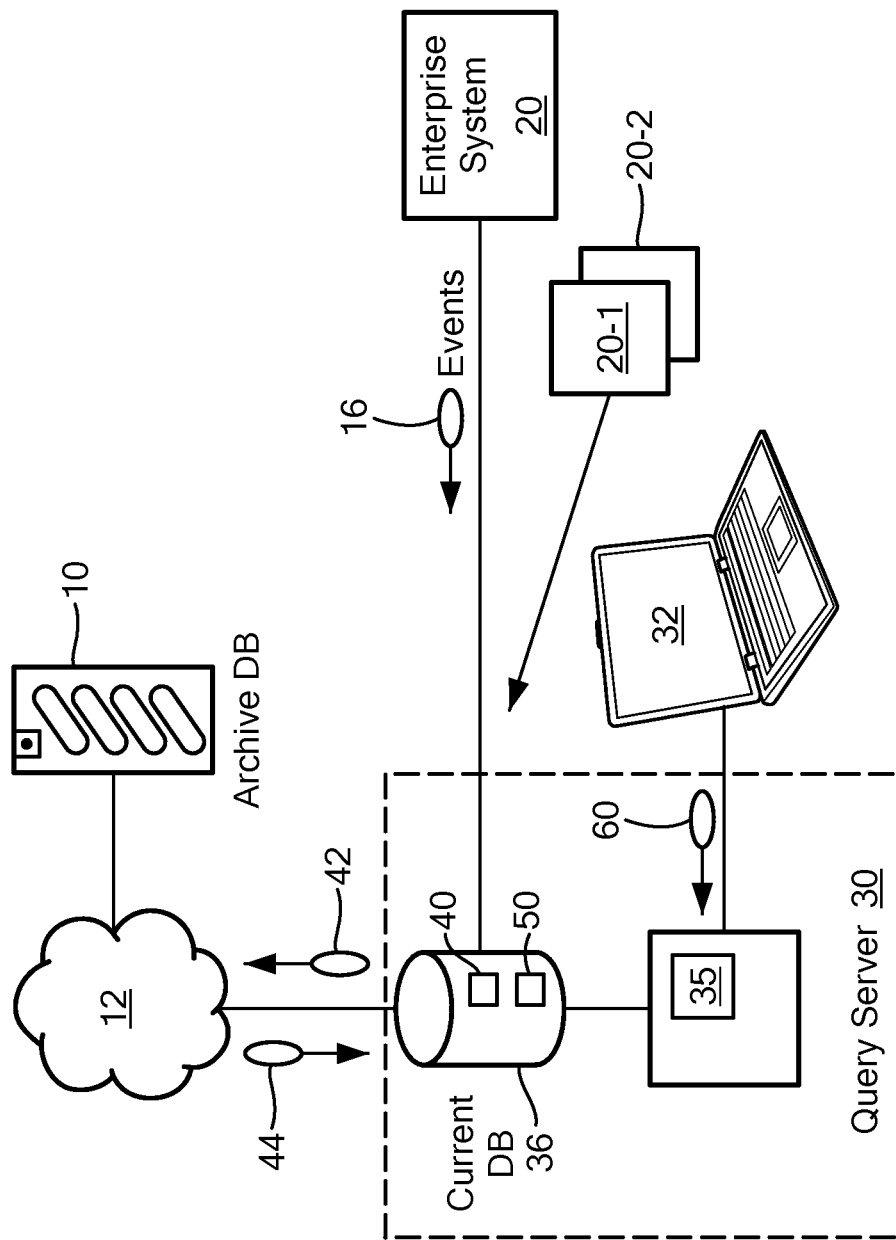
FIG. 1 is a diagram of a prior art approach for data gathering.

FIG. 1 is a diagram of a prior art approach for data gathering. Referring to FIG. 1, in a conventional prior art approach, data deemed excessively large and/or infrequently accessed is denoted as a candidate for offsite storage, such as in a cloud store 10. Such a cloud store apportions a large, redundant storage volume across multiple subscribers on a fee for services basis, thus relieving the subscriber of hardware requirements and backup/reliability concerns. Known vendors such as AMAZON® and GOOGLE® offer such services (e.g. S3 by Amazon), along with VM (virtual machine) resources, discussed further below. This seemingly endless availability of storage accessible via public access networks such as the Internet 12 give rise to the label "cloud store."

In the conventional approach, an enterprise system 20 generates events 16 or other periodic stream of data, and offloads the events 16 to a cloud management service 30 for receiving and storing the data, while still affording access via a remote or onsite user device 32. An enterprise system 20 is any networked or clustered arrangement serving a particular user community such as a business, government, university, etc. The cloud management service 30 includes a query server 34 having archive logic 35 for receiving, storing, and archiving the received events 16. Events 16 are typically sent upon generation, and received into a local DB 36. The local DB 36, responsive to the archive logic 35, stores events in a current file 40, and also archives events 42 to the cloud store 10 responsive to the archive logic 35. The incoming events 16 are referenced in a catalog 50 prior to being stored in either the current file 40 or the cloud store 10, to facilitate subsequent queries.

All enterprise system 20 events 16, therefore, pass through the cloud management service 30 on transmission to the cloud store 10. Depending on the burstiness of the enterprise system 20, and the number of enterprise systems supported, the cloud management service 30 and become overburdened with the stream of incoming events 16. Raw event data undergoes an intake process to organize it into a proper form for queries. Incoming events 16 need to be stored in either the local DB 36 or the cloud store 10, and the catalog 50 needs to be updated to reflect any changes. A sudden burst of multiple events 16 can have a detrimental effect on the cloud management service, particularly if more than one supported enterprise systems 20 issues a sequence of events.

Upon receipt of a query request 60 from the user device 32, the query server 34 generates a query directed to the local DB 40 and the archived events in the cloud store 10. Archived events 44 may be retrieved to satisfy the computed query response. Performance degradation from a burst of incoming events 16 requiring intake servicing may impede a response to the query request 60.

It would be beneficial, therefore, if the event intake could be offloaded onto the enterprise system 20 and allow the enterprise system to coalesce and send the events 16 directly to the cloud store 10 to avoid overburdening the cloud management service 20 and query server 30 with the variability of the event 16 intake stream.

Figure 2:
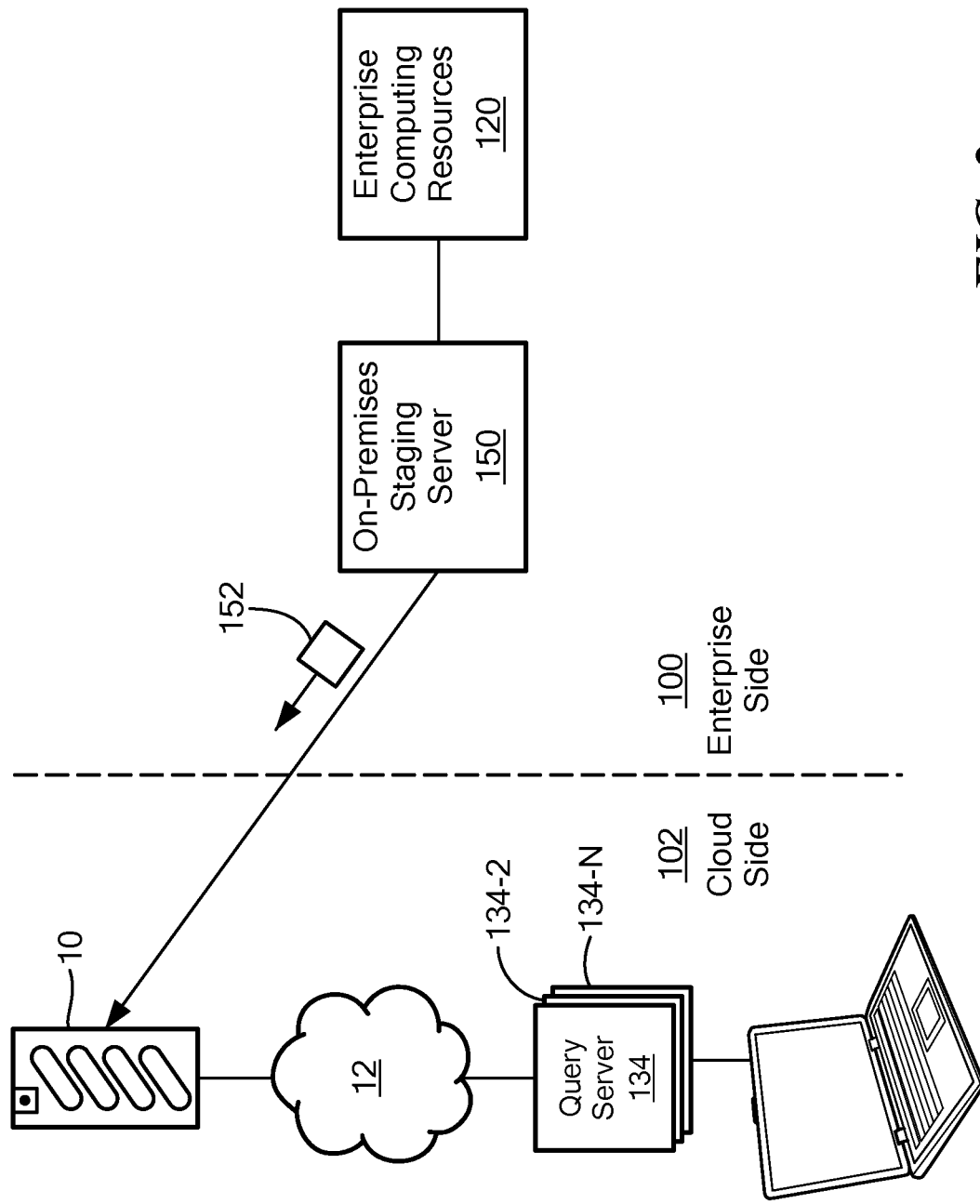
FIG. 2 is a context diagram of a data retrieval environment suitable for use with configurations herein.

FIG. 2 is a context diagram of a data retrieval environment suitable for use with configurations herein. Referring to FIGS. 1 and 2, FIG. 2 shows on-premises event processing that allows the events 16 to pass directly to the cloud store 10 without undergoing intake to the local DB 36 because a staging server 150 performs intake operations on the events 16 to generate data entities, or parts 152, adapted for upload transmission and storage directly to the cloud store 10.

In a bigdata query processing environment having a customer premises computing system 120, the staging server 150 receives queryable events from the customer premises computing system 120 for gathering, on an enterprise side 100 of a customer premises computing system, a plurality of periodically generated events 16. The events are collected from various sources in the enterprise computing system 120 supported by the staging server 150. An event is a block of binary or text data, and may emanate in several formats, but generally composed of sets of (key, value). The value can also be a (key,value) set. The on-premises staging server 150 allows event intake to occur on the enterprise side 100, so that the query server side 102 is relieved of intake and may perform only unimpeded query processing.

In the staging server 150, each event 16 defines a document such as a JSON document, and each document is responsive to a query received at a query server side 102, as the staging server 150 provides a data collection system in network communication with the query server 134. JSON or a similar, script based representations having a parseable form is employed by the staging server 150 to generate the parts 152.

The enterprise computing system 120 may be of varying size, complexity and activity, and a plurality of events are sporadically generated based on activity, thus forming a stream of events into the staging sever 150. It should be noted that "stream" refers to the irregular and unpredictable flow of events 16, and not to streaming audio or visual media. The staging server 150 aggregates a portion of the plurality of events into a part 152 or part file, such that each part file stores a subset of the gathered events arranged in a columnar format. The columnar format, discussed further below, stores similarly named fields consecutively in a file representative of all values of the field, hence representing a column as they might be stored in a conventional relational table (but without requiring each document have a value for a field).

As the part files storing accumulated events approach a threshold, such as 2 GB in size, the staging server 150 uploads the parts to the cloud storage 10. Each part represents a collection of documents containing unstructured data, and stored in a columnar format as disclosed in copending U.S. patent application Ser. No. 14/304,497, filed Jun. 13, 2014, entitled "COLUMNAR STORAGE AND PROCESSING OF UNSTRUCTURED DATA," incorporated herein by reference in entirety. Unstructured data, as employed herein, is arranged with syntax and nesting rules but without inclusion and type rules. The syntax generally employs a value for each of one or more named fields in a document, and a set of documents define a collection. This is in contrast to an RDBMS, where a table includes records of strongly typed fields, each having a value. A particularly amenable representation is provided by data arranged according to JSON, however this is merely an example arrangement and other unstructured and semi-structured data organizations may be employed.

Once uploaded to the cloud storage repository 10, the cloud storage repository 10 is responsive to query requests 60 of the events from the query server 134. It should be emphasized that the computing resources available for queries benefit from the same virtual features as collection storage. One of the benefits in using cloud storage is that it easily allows use of a distributed/parallel query engine, i.e. to bring up more than one VM (compute node) that all have access to the "global storage" that the cloud store provides. This architecture is much simpler than conventional "shared" architectures where the data needs to be shared across multiple nodes and the system has is still responsible for dealing with replication, failures etc.

This provides a particular advantage over conventional enhancements using cloud stores and VMs, In a VM environment, the distinctions between servers/nodes/processes is abstracted, as new VMs may be simply instantiated and handled by the cloud computing environment. For example, in the approach of FIG. 2, additional query servers 134-2, 134-N may be defined simply by instantiating more VMs as compute nodes for performing the query, however since the staging server 150 writes the data via the parts 152, none of the query servers 134 need have knowledge of writing the data. Therefore, even if there are many query nodes 134 sharing the cloud storage for queries, none of the compute nodes (VMs in the query sever 134) need be concerned with writing the data; the end/edge nodes are the ones that write the data without even the awareness of the reader nodes. Only a single query node is needed to access the catalog and interpret the header files (discussed further below), but any query node may be employed. The result is that the query server 134 defines a plurality of compute nodes for computing results of the query requests, such that the compute nodes merely read the columnar representation written from the staging server 150 on the enterprise side 100, they need not have written or handled the collections or events prior to querying.

Figure 3:
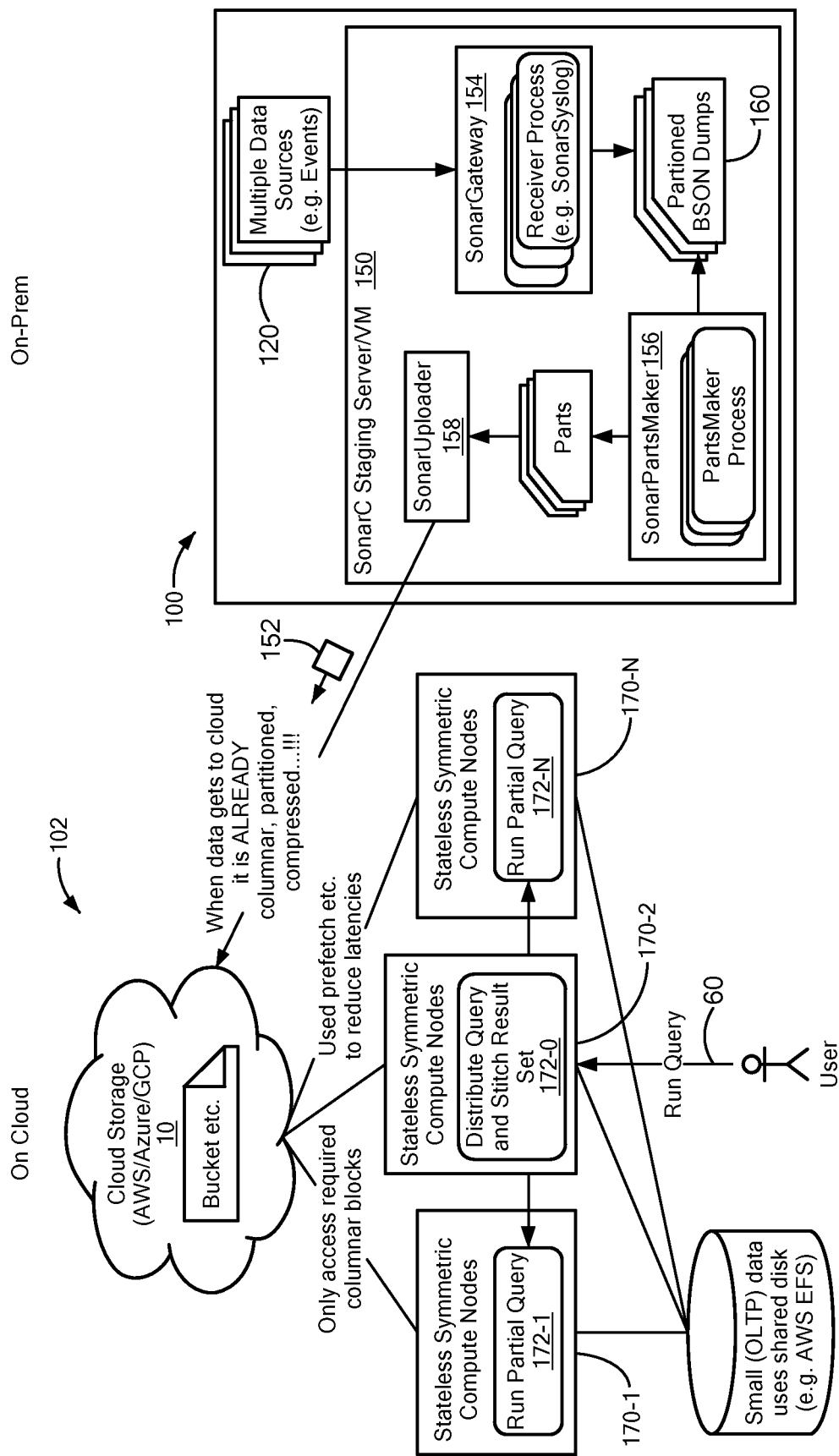
FIG. 3 is a block diagram of data gathering as disclosed herein.

FIG. 3 is a block diagram of data gathering as disclosed herein. Referring to FIGS. 1-3, the enterprise computing resources 120 define multiple event sources for generating the events 16. By launching the staging server 150 on premises with the enterprise computing resources 120, the part 152 processing occurs on the enterprise side 100, effectively offloading the intake of the events from the query server 134, and also consolidating the event storage to the cloud storage 10 repository.

A gateway 154 gathers, on an enterprise side 100 of a data collection system, a plurality of periodically generated events 16. The gateway converts the events 16, depending on the format (the software recognizes many formats that may be used for event reporting) into a streamlined structured format such as BSON (Binary JSON, or JSON with structured types, including dates, arrays of strings, subdocuments). Using a user-supplied set of rules for filtering the events 16, the gateway converts the B SON by manipulating (key,value) pairs in the BSON. Operations include removing keys, adding keys, performing mathematical and textual manipulations on values, redact sensitive information, and combining values from different keys. IP address matching and conversion may also be performed, such as to a hostname or vice versa. The result is a BSON file 160 that defines the events as documents in an unstructured database syntax.

A parts maker 156 coalesces and accumulates the gathered documents in the BSON files 160 into an aggregation defined by part files having a columnar representation of the documents. Aggregating the columnar format further includes identifying field name and value pairs in the subset of events, identifying documents, such that each document includes at least one of the field name and value pairs, and storing all values of commonly named fields in a storage adjacency, such as consecutive values in a file. The part files 152 represent a portion of a database collection, and are arranged to allow seamless integration and addition to a corresponding collection at the cloud storage repository 10.

The uploader 158 uploads the accumulated part files 152 to the cloud storage repository 10. Once uploaded, the part files 152 and corresponding collections are available for query requests 60. A bank of compute nodes 170-1 . . . 170-N (typically virtual nodes from a service) each run a partial query process 172-1 . . . 172-N on a partitioned portion of the collection, discussed further below. A master process 172-0 maintains a catalog of the distributed, partial queries and coalesces, or "stitches" the partial query results together into an aggregate query result. Additional details on query partitioning and result stitching is available in the copending application cited above, however individual partial collections on which the query processes 172 operate benefit from the notion that much of the query does not require residence of the entire collection on which the query is performed.

Figure 4:
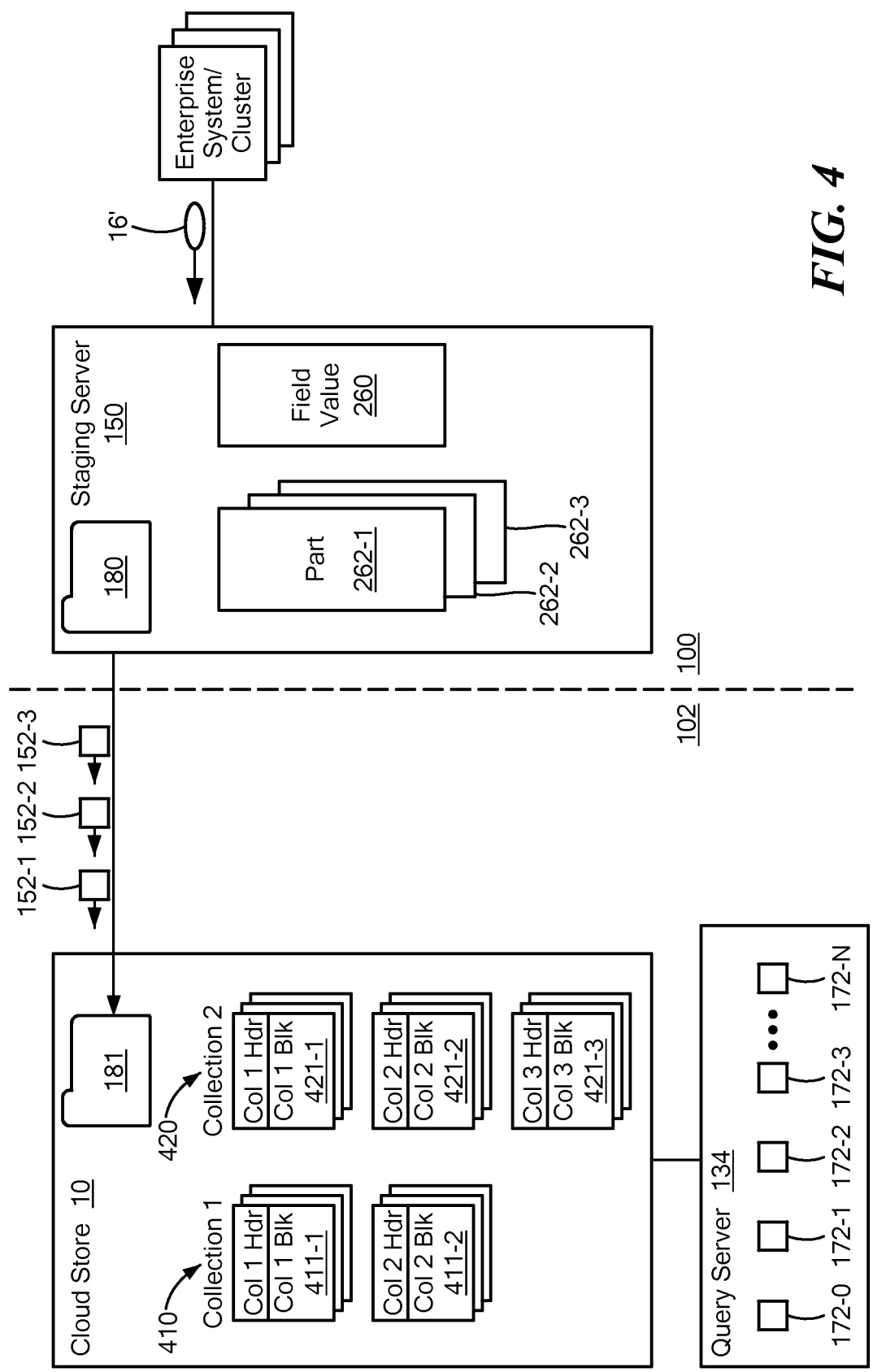
FIG. 4 is a data flow diagram of the gathered data as in FIG. 3.

FIG. 4 is a data flow diagram of the gathered data as in FIG. 3. Referring to FIGS. 3 and 4, the parts are generally defined by part files including a block file and a header file. The block file contains the columnar data and the header file contains corresponding metadata. Each part file 152 accumulates up to a predetermined size deemed optimal for transport. In the example configuration, this size is 2 GB, however any suitable size may be selected. Upon transport (upload) as part files, the events 16 have already been normalized and formatted into the columnar format for integration into existing data collections, or new collection creation if needed.

The enterprise computing resources 120, which may comprise a plurality of clustered CPUs or computers 120-1 . . . 120-N, produces the raw event data 16' gathered in unstructured files 260 such as BSON dumps 260 accessible by the staging server 150, which operates as an on-premises client for event gathering. A plurality of part files 262-1 . . . 262-N (262 generally) accumulates, and an outgoing folder 180 stores the part files 262 upon attaining the predetermines size for upload.

At a suitable time, an incoming folder 181 at the cloud store 10 receives the transported part files 152-1, 152-2, 152-3. Reviewing the data architecture, a collection includes a set of documents, each document having one or more fields. Values of each field define a column and are stored together as columnar data. The columnar data occupies a block file, and metadata such as value ranges occupies the header file, thus each part (part file 152) is defined by a block file and a header file. The header file is typically much smaller than the corresponding block file. The query server 134 retrieves only the header files for the uploaded parts, thus avoiding an upload of the larger block files to the query server 134. At the cloud store 10, collections are stored as part files, each part including a header file and block file. In FIG. 4, the cloud store 10 includes collections 410 and 420. Collection 410 includes two columns 411-1 and 411-2, each represented by a plurality of pairs of block and header files. Each part includes data for one or more columns, and stores the values of the column in an adjacency such that each value of a named field is together. Similarly, collection 420 includes three columns 421-1, 421-2, and 421-3, such the each column is represented by a plurality of pairs of block and header files.

Upon upload of new part files 152, the query server 134 retrieves the header files corresponding to the uploaded part files, and identifies, based on the retrieved header files, a collection corresponding to each of the header files. The query server 134 then updates, at a master node of the query server 134, a catalog for indexing the block files corresponding to the collection stored on the cloud storage repository 10. In effect, therefore, the query server 134 need only retrieve and catalog the header files, and defers operations and retrieval of block files until actually required by a query request 60. This is particularly beneficial when the cloud storage repository is in network communication with a plurality of customer premises computing systems and operable to intake the part files from each customer premises computing system, as it allows deferral in batch to off-peak times.

Upon receipt of a query request 60, the plurality of compute processes 172 is each operable to perform a partial query. The master process 172-0 maintains a catalog and delegates partial queries to each of the other processes 172 by assigning a subset of the part files for each column called for by the query. In this manner, only the columns actually considered by the query request 60 need to be retrieved.

Figure 5A:
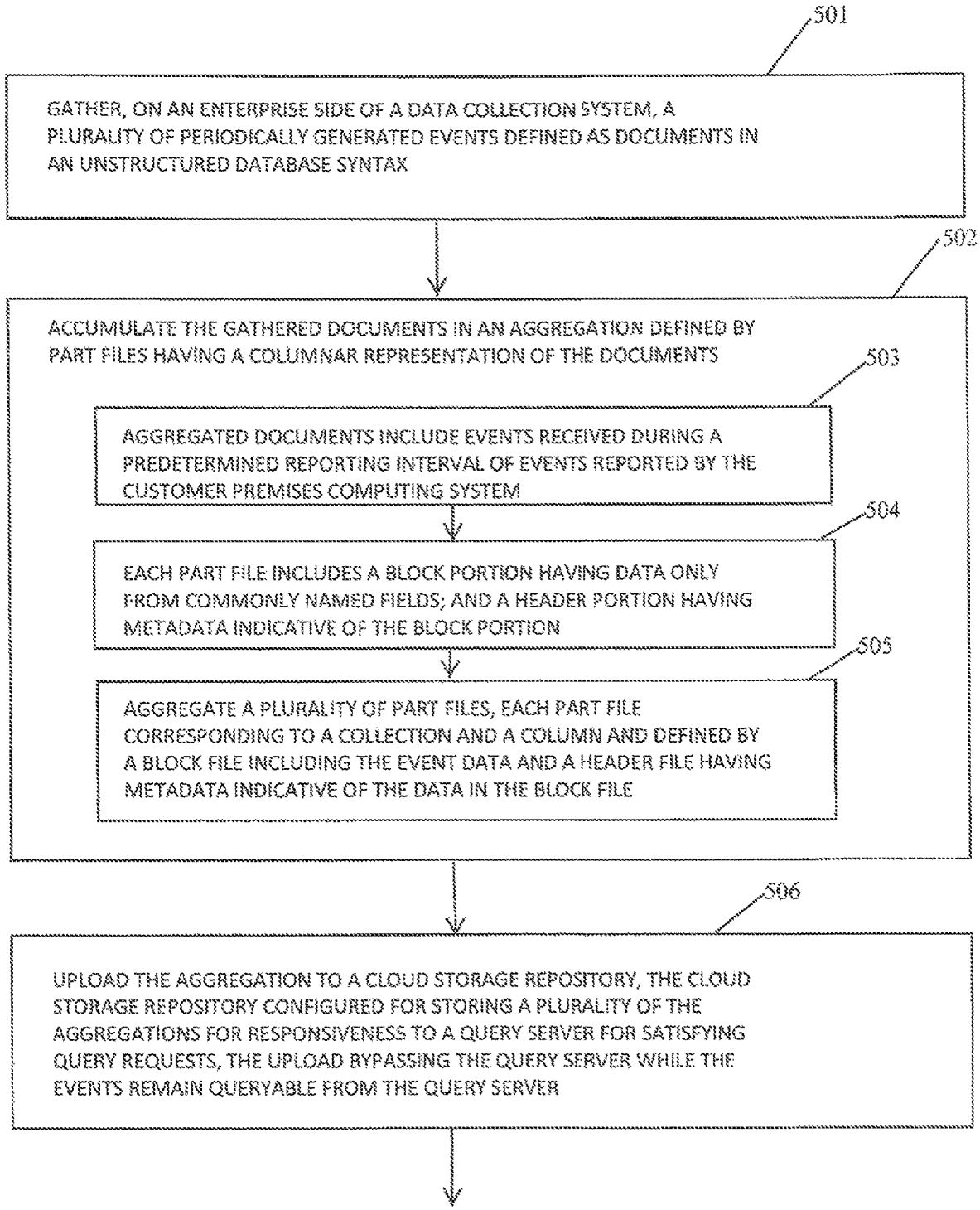
FIGS. 5A and 5B are is flowchart of the configuration of FIGS. 3 and 4.
Figure 5B:
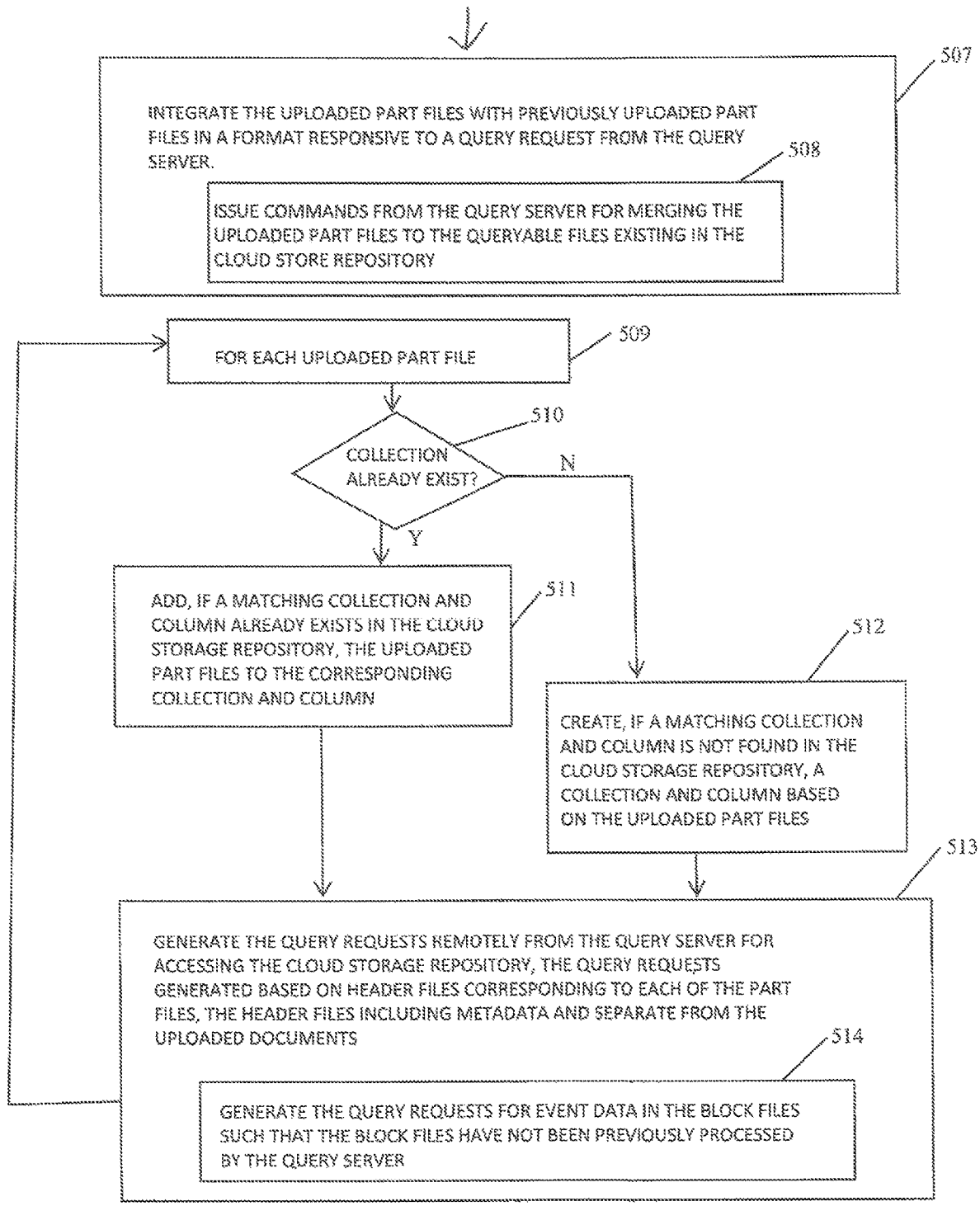

FIG. 5 is a flowchart of the configuration of FIGS. 3 and 4 showing an example of operations and conditions occurring during event gathering and upload. Referring to FIGS. 3-5, at step 501, the method of gathering and storing data in a cloud based architecture includes gathering, on an enterprise side 100 of a data collection system, a plurality of periodically generated events 16 defined as documents in an unstructured database syntax such as JSON. Any suitable unstructured or semi-structured scripted or parseable form may be employed. In the example arrangement, the documents define events 16 generated sporadically from an enterprise system 120 at a customer premises site. The staging server 150 accumulates the gathered documents in an aggregation defined by part files 152 having a columnar representation of the documents, as disclosed at step 502. In the example configuration, the aggregated documents include events received during a predetermined reporting interval of events reported by the customer premises computing system, as depicted at step 503. Each part file includes a block portion having data only from commonly named fields, and a header portion having metadata indicative of the block portion, as shown at step 504. The header and block portions may be two separate files, however the header includes the metadata about the block file in the form of entries for each block. The outgoing folder 180 aggregates a plurality of the part files 152, such that each part file corresponds to a collection and a column and is defined by a block file including the event data and a header file having metadata indicative of the data in the block file, as depicted at step 505. The entire collection therefore includes a set of part files including a header file and block file for each part 152.

Upon each part file 262 attaining a certain size, or following a minimal reporting interval if the part file is not full, the staging server 150 uploads the aggregation to a cloud storage repository 10 configured for storing a plurality of the aggregations for responsiveness to a query server 134 for satisfying query requests 60, as depicted at step 506. The upload bypasses the query server 134 for the initial upload, while the events 16 remain queryable from the query server 134, thus relieving the query server 134 from the burden of processing incoming events 16 from multiple sites.

Uploading moves the part files 152 from the outgoing folder 180 to the incoming folder 181. The query server 134 integrates the uploaded part files 152 with previously uploaded part files in a format responsive to a query request 60 from the query server 134, as depicted at step 507. This includes issuing commands from the query server 134 for merging the uploaded part files 152 to the queryable files existing in the cloud store repository 10, shown at step 508, thereby merging the documents (events) in the new part files 152 with the collections already stored.

The query server 134 need only manipulate the header files that refer (correspond to) the block files, and does not need to operate on the larger block files themselves. At step 509, for each uploaded part file, a check is performed to determine if a preexisting collection exists for the part file 152, as depicted at step 510. The query server 134 adds, if a matching collection and column already exists in the cloud storage repository, the uploaded part files 152 to the corresponding collection and column to extend the collection, as disclosed at step 511. Alternatively, the query server 134 creates, if a matching collection and column is not found in the cloud storage repository 10, a collection and column based on the uploaded part files, depicted at step 512.

In the example arrangement, using columnar files named according to the field name of the column, this includes, for each cloud-uploaded collection part in the incoming cloud folder 181, finding a collection with the same name already in the database, and extending the collection by adding the cloud-uploaded collection part.

The collection part is a columnar form of an unstructured collection such as a JSON collection, and represents a part of the documents in the collection. The process is as follows:
i. Download the block header files of the columns in the collection part from the cloud.
ii. For each column in the downloaded part that also exists in the exiting collection:
  1. Match each existing collection column with the incoming column, by name, and add the downloaded headers in the header file to the existing collection header file.
  2. Move, on the cloud store 10 (without downloading) the column block file out of the "incoming" folder into a permanent folder.
iii. For each column that is new (only exists in the downloaded part), create a new column in the existing collection, then perform ii.1 and ii.2 above.

The foregoing maintains a ready repository of the events 16 as an unstructured database in the cloud store 10. The cloud store 10 is further responsive to query requests 60 issued by the query server 134.

At step 513, a GUI (graphical user interface) or similar interaction is used for generating the query requests 60 remotely from the query server for accessing the cloud storage repository 10, such that the query requests 60 are generated based on header files corresponding to each of the part files where the header files include the metadata and remain separate from the uploaded documents in the block files, as depicted at step 513. Any suitable user device and/or web interface may be employed to generate the query request 60 for invocation from the query server 134. The result is generation of the query requests 60 for event data in the block files such that the block files have not been previously processed by the query server 134, as they were directly uploaded to the cloud storage repository 10 from enterprise sites generating the event data, as shown at step 514.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method comprising:
gathering, by a processor, a plurality of events defined in a database syntax that is not structured, the plurality of events to be stored in a cloud storage repository;
aggregating, by the processor, the plurality of events into one or more part files, each of the one or more part files storing a subset of the plurality of events in a columnar format, and wherein each of the one or more part files comprises:
a header file that includes metadata corresponding to a subset of the plurality of events stored in the part file and is separate from the subset of events stored in the part file; and
a block file that comprises the subset of the plurality of events stored in the part file; and
reducing, by the processor, a computational intensity for a query server to process a query associated with the plurality of events by uploading the one or more part files to the cloud storage repository to be processed by the query server based on the header files and without accessing at least one of the block file or the plurality of events.

2. The method of claim 1, wherein aggregating the plurality of events comprises:
identifying field name and value pairs in the plurality of events;
identifying a plurality of documents, wherein each of the plurality of documents includes at least one of the field name and value pairs; and
storing all values paired with similarly named fields consecutively so that each block file includes values from fields that are similarly named.

3. The method of claim 1, wherein uploading the one or more part files to the cloud storage repository comprises:
monitoring a size of each of the one or more part files; and
in response to determining that the size of a part file is at or above a threshold limit, uploading the part file to the cloud storage repository.

4. The method of claim 1, wherein the metadata of the header file of each of the one or more part files indexes the subset of events stored in the part file to facilitate query requests.

5. The method of claim 4, wherein the metadata of the header file of each of the one or more part files indicates a collection that the part file is a part of and wherein a subset of events stored in each of the one or more part files is indexed based on a collection that the part file is a part of.

6. The method of claim 1, wherein the database syntax is unstructured or semi-structured.

7. A system comprising:
a memory; and
a processor operatively coupled to the memory, the processor to:
gather a plurality of events defined in a database syntax that is not structured, the plurality of events to be stored in a cloud storage repository;
aggregate the plurality of events into one or more part files, each of the one or more part files storing a subset of the plurality of events in a columnar format, and wherein each of the one or more part files comprises:
a header file that includes metadata corresponding to a subset of the plurality of events stored in the part file and is separate from the subset of events stored in the part file; and
a block file that comprises the subset of the plurality of events stored in the part file; and
reduce a computational intensity for a query server to process a query associated with the plurality of events by uploading the one or more part files to the cloud storage repository to be processed by the query server based on the header files and without accessing at least one of the block file or the plurality of events.

8. The system of claim 7, wherein to aggregate the plurality of events, the processor is to:
identify field name and value pairs in the plurality of events;
identify a plurality of documents, wherein each of the plurality of documents includes at least one of the field name and value pairs; and
store all values paired with similarly named fields consecutively so that each block file includes values from fields that are similarly named.

9. The system of claim 7, wherein to upload the one or more part files to the cloud storage repository, the processor is to:
monitor a size of each of the one or more part files; and
in response to determining that the size of a part file is at or above a threshold limit, upload the part file to the cloud storage repository.

10. The system of claim 7, wherein the metadata of the header file of each of the one or more part files indexes the subset of events stored in the part file to facilitate query requests.

11. The system of claim 10, wherein the metadata of the header file of each of the one or more part files indicates a collection that the part file is a part of and wherein a subset of events stored in each of the one or more part files is indexed based on a collection that the part file is a part of.

12. The system of claim 7, wherein the database syntax is unstructured or semi-structured.

13. A non-transitory computer-readable medium having instructions stored thereon which, when executed by a processor, cause the processor to:
gather a plurality of events defined in a database syntax that is not structured, the plurality of events to be stored in a cloud storage repository;
aggregate, by the processor, the plurality of events into one or more part files, each of the one or more part files storing a subset of the plurality of events in a columnar format, and wherein each of the one or more part files comprises:
a header file that includes metadata corresponding to a subset of the plurality of events stored in the part file and is separate from the subset of events stored in the part file; and
a block file that comprises the subset of the plurality of events stored in the part file; and
reduce a computational intensity for a query server to process a query associated with the plurality of events by uploading the one or more part files to the cloud storage repository to be processed by the query server based on the header files and without accessing at least one of the block file or the plurality of events.

14. The non-transitory computer-readable medium of claim 13, wherein to aggregate the plurality of events, the processor is to:

identify field name and value pairs in the plurality of events;

identify a plurality of documents, wherein each of the plurality of documents includes at least one of the field name and value pairs; and store all values paired with similarly named fields consecutively so that each block file includes values from fields that are similarly named.

15. The non-transitory computer-readable medium of claim 13, wherein to upload the one or more part files to the cloud storage repository, the processor is to:

monitor a size of each of the one or more part files; and in response to determining that the size of a part file is at or above a threshold limit, upload the part file to the cloud storage repository.

16. The non-transitory computer-readable medium of claim 13, wherein the metadata of the header file of each of the one or more part files indexes the subset of events stored in the part file to facilitate query requests.

17. The non-transitory computer-readable medium of claim 16, wherein the metadata of the header file of each of the one or more part files indicates a collection that the part file is a part of and wherein a subset of events stored in each of the one or more part files is indexed based on a collection that the part file is a part of.

* * * * *